(12) United States Patent
Krebs et al.

(10) Patent No.: US 6,495,265 B1
(45) Date of Patent: *Dec. 17, 2002

(54) RADIATION SHIELDED LAMINATE

(75) Inventors: Robert R. Krebs, Georgetown, TX (US); Ernest L. Phelps, Waco, TX (US); Genevieve L. Tepera, Rogers, TX (US)

(73) Assignee: Premark RWP Holdings, Inc., Wilmington, DE (US)

( * ) Notice: Subject to any disclaimer, the term of this patent is extended or adjusted under 35 U.S.C. 154(b) by 47 days.

This patent is subject to a terminal disclaimer.

(21) Appl. No.: 09/649,089

(22) Filed: Aug. 28, 2000

(51) Int. Cl.[7] ............... B32B 15/08; B32B 27/04
(52) U.S. Cl. ............ 428/460; 428/461; 428/463; 428/464; 156/307.3; 156/307.4; 156/307.7
(58) Field of Search ................ 428/460, 461, 428/463, 464; 156/307.3, 307.4, 307.7

(56) References Cited

U.S. PATENT DOCUMENTS

| | | |
|---|---|---|
| 3,654,711 A | 4/1972 | Taylor ............... 35/66 |
| 3,884,771 A | 5/1975 | Miyao et al. |
| 3,889,736 A | 6/1975 | Firks .............. 160/135 |
| 3,936,575 A * | 2/1976 | Watanabe et al. ....... 428/417 |
| 4,364,731 A | 12/1982 | Norling et al. ........ 433/218 |
| 4,578,308 A | 3/1986 | Hani et al. ........... 428/297 |
| 4,584,223 A | 4/1986 | Krapf ............... 428/58 |
| 4,678,707 A | 7/1987 | Shinozaki et al. ...... 428/323 |
| 4,888,247 A * | 12/1989 | Zweben et al. ........ 428/105 |
| 4,935,281 A * | 6/1990 | Tolbert et al. ........ 428/116 |
| 5,089,348 A | 2/1992 | Louderback .......... 428/464 |
| 5,200,853 A | 4/1993 | Berkman ............. 359/14.43 |
| 5,361,164 A | 11/1994 | Steliga ............. 359/455 |
| 5,478,414 A | 12/1995 | Mozelewski et al. .... 148/265 |
| 5,480,505 A | 1/1996 | Andre .............. 156/201 |
| 5,814,395 A | 9/1998 | Soellaart-Roelofsen et al. . 428/213 |
| 5,941,713 A | 8/1999 | Wayner et al. ........ 434/414 |
| 5,955,203 A | 9/1999 | Briggs et al. ........ 428/460 |
| 5,989,668 A * | 11/1999 | Nelson et al. ........ 428/50 |
| 6,068,041 A | 5/2000 | Miles et al. ......... 160/135 |
| 6,165,309 A * | 12/2000 | Burnell et al. ....... 156/308.2 |
| 6,171,705 B1 * | 1/2001 | Clifford ............ 428/464 |
| 6,248,401 B1 * | 6/2001 | Chiang et al. ........ 427/255.7 |

FOREIGN PATENT DOCUMENTS

| | | |
|---|---|---|
| DE | 2025675 | 9/1971 |
| DE | 261702 A * | 11/1988 |
| EP | 31701 A1 | 7/1981 |
| EP | 0181760 A2 | 6/1986 |
| EP | 301720 A2 | 2/1989 |
| EP | 390999 A1 | 10/1990 |
| EP | 472822 A2 | 3/1992 |
| EP | 0708222 A | 4/1996 |
| EP | 0934977 A1 | 8/1999 |
| EP | 993942 A1 | 4/2000 |
| FR | 2443121 | 6/1980 |
| GB | 2315367 A | 1/1998 |
| JP | 60025747 | 2/1985 |
| JP | 6201897 | 1/1987 |
| JP | 63286933 | 5/1998 |
| JP | 11-058601 A * | 3/1999 |

* cited by examiner

*Primary Examiner*—Paul Thibodeau
*Assistant Examiner*—Monique R. Jackson
(74) *Attorney, Agent, or Firm*—Welsh & Flaxman LLC

(57) ABSTRACT

The invention relates to a laminate including a decorative layer, a first resin impregnated core layer, a radiation barrier layer and a second resin impregnated core layer. The laminate prevents the penetration of radiation therethrough and maybe used in the construction of ceiling and wall panels, flooring, furniture, fixtures, cabinet and door cladding, protective screens and other objects which will effectively prevent the passage of radiation from an isolated enclosure.

6 Claims, 2 Drawing Sheets

RADIATION SHIELDED LAMINATE

BACKGROUND OF THE INVENTION

1. Field of the Invention

The present invention relates to a radiation shielded laminate. More particularly, the invention relates to a laminate provided with a lead layer preventing the penetration of radiation therethrough.

2. Description of the Prior Art

Decorative laminates have found wide acceptance within the furniture and building industries. The durability, cost and versatility of decorative laminates make them useful in almost any structural application. For example, decorative laminates are found in everything from flooring products to furniture to countertops.

With this in mind, the laminate industry is continually striving to improve the functionality of decorative laminates. Whether the improvement relates to a locking tongue and groove configuration for decorative laminate flooring panels or improved surface characteristics for a countertop, the advances in decorative laminate manufacturing make these materials equal to, or better than, the materials they are designed to replace.

Radiation is currently used in a wide variety of applications. For example, radiation is often used in medicine, research and industrial applications. Radiation is, however, dangerous when not properly controlled.

As such, a variety of mechanisms have been developed for controlling radiation to prevent undesired exposure. The mechanisms include everything from radiation sensing badges to isolated rooms which prevent the escape of released radiation.

The construction of isolated rooms is highly expensive and requires the assembly of multiple construction layers to achieve a properly controlled room. For example, and in accordance with current known practices, lead sheets are first secured about the room. The lead sheets are then covered with conventional wall and flooring products. The need for the application of multiple layers in the construction of a controlled room adds to both the material and labor costs associated with the construction of the room. Furniture and other objects which must prevent the penetration of radiation must be constructed in a similar manner.

A need, therefore, exists for a construction material permitting the ready fabrication of ceiling and wall panels, flooring, furniture, fixtures, cabinet and door cladding, protective screens and other objects designed to prevent the passage of radiation therethrough. The present invention provides such a construction material.

SUMMARY OF THE INVENTION

It is, therefore, an object of the present invention to provide a laminate including a first resin impregnated layer and a radiation barrier layer.

It is also an object of the present invention to provide a laminate including a polymer layer, a binding layer and a lead layer.

It is further an object of the present invention to provide a laminate including a decorative layer, a first resin impregnated core layer, a radiation barrier layer and a second resin impregnated core layer.

Other objects and advantages of the present invention will become apparent from the following detailed description when viewed in conjunction with the accompanying drawings, which set forth certain embodiments of the invention.

DESCRIPTION OF THE PREFERRED EMBODIMENT

The detailed embodiment of the present invention is disclosed herein. It should be understood, however, that the disclosed embodiment is merely exemplary of the invention, which may be embodied in various forms. Therefore, the details disclosed herein are not to be interpreted as limited, but merely as the basis for the claims and as a basis for teaching one skilled in the art how to make and/or use the invention.

Figure 1:
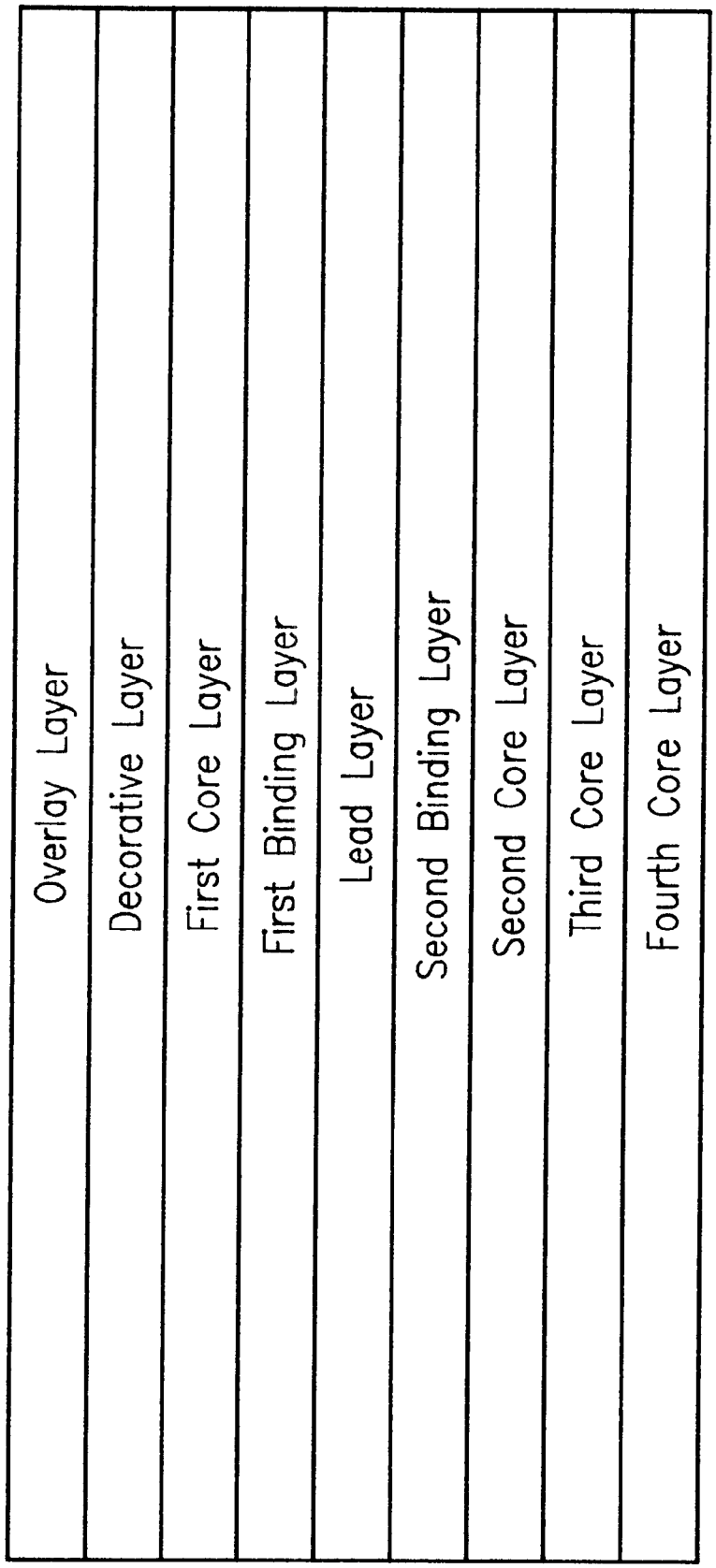
FIG. 1 is a schematic of a laminate manufactured in accordance with the present invention.

Referring to FIG. 1, a decorative laminate 10 in accordance with the present invention is disclosed. The decorative laminate 10 includes an exterior overlay paper layer 12, a decorative layer 14, a first core layer 16, a first binding layer 18, a lead layer 20, a second binding layer 22 and three concluding core layers 24, 26, 28. While a specific layering pattern is disclosed in accordance with a preferred embodiment of the present invention, the layering pattern may be varied, somewhat, without departing from the spirit of the present invention.

The overlay paper layer 12 is preferably a melamine impregnated paper layer. The decorative layer 14 is a conventional pattern sheet positioned directly beneath the overlay paper layer 12. When the laminate is fully heated and pressed, as will be discussed below in greater detail, the overlay paper layer 12 becomes translucent, fully exposing the decorative layer 14. With this in mind, the decorative layer 14 is substantially responsible for the aesthetic appearance of the finished decorative laminate 10. Decorative layers are chosen from a wide array of sheets. For example, the decorative layer 14 may be a solid color (for example, white) or include an aesthetically appealing pattern.

As discussed above, the decorative layer 14 provides the laminate with an attractive appearance. The overlay paper layer 12 and the decorative layer 14 also dictate the surface characteristics of the final decorative laminate 10. For example, the composition of the overlay and decorative layers help to dictate the decorative laminate's resistance to chemical agents, heat, light, shock and abrasion.

Decorative sheets are commonly manufactured from high quality 80–202 grams/m$^2$ ream weight, pigment filled, alpha cellulose paper impregnated with a water alcohol or water solution of melamine-formaldehyde resin. The resin impregnated decorative sheets are subsequently dried, partially cured, and finally cut into sheets. The pigment filled, alpha cellulose paper of the decorative sheet, may include a solid color, a decorative design, or a photo-gravure reproduction of natural materials, such as, wood, marble, leather, etc. The aesthetic characteristics of the cellulose paper are revealed as the laminate's decorative design upon completion of the decorative laminate.

The first core layer 16 is preferably a phenolic resin impregnated sheet, although other materials may be used without departing from the spirit of the present invention. For example, the first core layer 16 includes a sheet of 120–323 grams per square meter dry phenolic resin impregnated kraft paper. The kraft paper is impregnated throughout and bonded with a substantially cured phenolic resin which has been converted to a thermoset state during the initial laminating step.

The first binding layer 18 is preferably composed of DYLARK®, a styrene-maleic anhydride copolymer manufactured by NOVA Chemicals, Inc. More preferably, the binding layer is composed of DYLARK® 481. DYLARK® exhibits outstanding bonding characteristics with the phenolic resin impregnated kraft paper making up the first core layer 16. DYLARK® also exhibits outstanding bonding characteristics with the lead layer 20 discussed below in greater detail.

With regard to DYLARK®'s bonding with the phenolic resin impregnated kraft paper, the excellent bonding characteristics are a result of the carboxyl groups found on the maleic anhydride of the DYLARK® copolymer. The carboxyl groups bind with the phenolic resin to produce a very stable laminate. Although DYLARK® is disclosed as a preferred binding layer material in accordance with the present invention, other functionally and structurally equivalent polymers may be used without departing from the spirit of the present invention.

With regard to DYLARK®'s bonding with the lead layer 20, the excellent bonding characteristics may be a result of DYLARK®'s ability to bond its acid groups with the surface layer of the lead.

The lead layer 20 is preferably approximately 0.476 cm to approximately 0.3175 cm. This range generally provides a laminate of sufficient thickness to prevent the passage of undesirable radiation while also permitting the ready fabrication and installation. However, those skilled in the art will understanding that the required lead thickness will be determined based upon the application and x-ray equipment with which it is to be associated, and various thickness may be used without departing from the spirit of the present invention. Ultimately the useful thickness of the lead layer is determined by considering a variety of factors including, but not limited to, whether the thickness will permit the use of conventional laminate working tools, cost, the lead's ability to prevent the passage of radiation therethrough, and the excessive weight added by the inclusion of the lead.

While lead is disclosed as the preferred material for use in the construction of the present decorative laminate 10, other radiation blocking materials may be used without departing from the spirit of the present invention.

A second binding layer 22 couples the lead layer 20 to the remaining core layers 24, 26, 28 in the same manner as discussed above with the first binding layer 18. Specifically, the second binding layer 22 is also preferably composed of DYLARK®.

Finally, the three core layers 24, 26, 28 extending toward the second side 34 of the decorative laminate 10 are preferably phenolic resin impregnated sheets substantially similar to the first core layer 16 discussed above in greater detail.

In accordance with the present invention, the decorative laminate 10 is formed in much the same manner as conventional decorative laminates. The layers are first stacked and placed between steel plates. The laminate stack is then subjected to temperatures in the range of 121° C.–160° C. and about 56.24 kg/cm$^2$ to 112.48 kg/cm$^2$ for a time sufficient to consolidate the laminate and cure the resins (generally about 25 minutes to an hour). More specifically, it has been found that satisfactory bonding results are achieved when the laminate stack is subjected to a temperature greater than the glass transition temperature of DYLARK® 481 which is 133° C. In fact, our tests show that pressing at a temperature of approximately 141° C. with 1,000 psi for 20 minutes produces a satisfactory bond, and pressing at a temperature of approximately 151° C. with 70.3 kg/cm$^2$ 20 minutes produces an even stronger bond between the phenolic resin layer, the DYLARK® layer and the lead layer.

The pressure and heat force the resin in the paper sheets to flow, cure and consolidate the sheets into a unitary laminated mass referred to in the art as a decorative high pressure laminate. Generally, more than one laminate is formed at one time. Multiple laminates are formed by inserting a plurality of assembled sheets in a stack. Release sheets are positioned between the assembled sheets to separate the various laminates stacked together. After consolidation, the release sheets allow the individual laminates to be separated.

Figure 2:
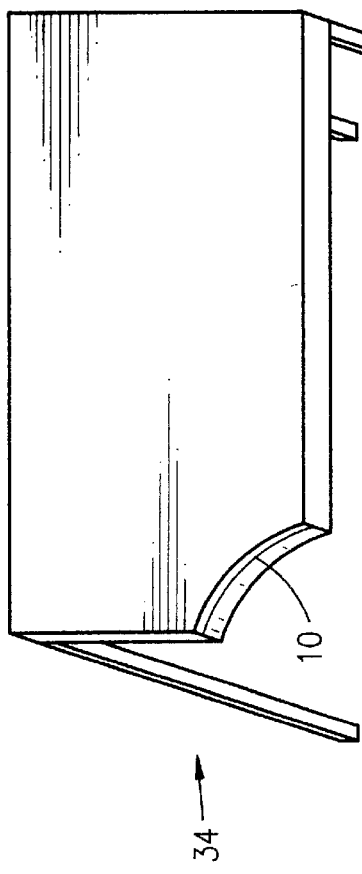
FIG. 2 is a partial cross sectional view of a wall panel manufactured in accordance with the present invention.
Figure 3:
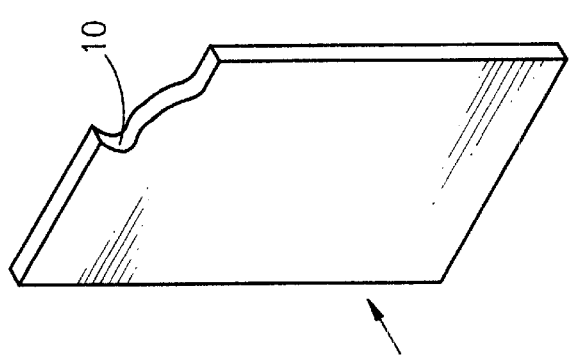
FIG. 3 is a partial cross sectional view of a flooring panel in accordance with the present invention.
Figure 4:
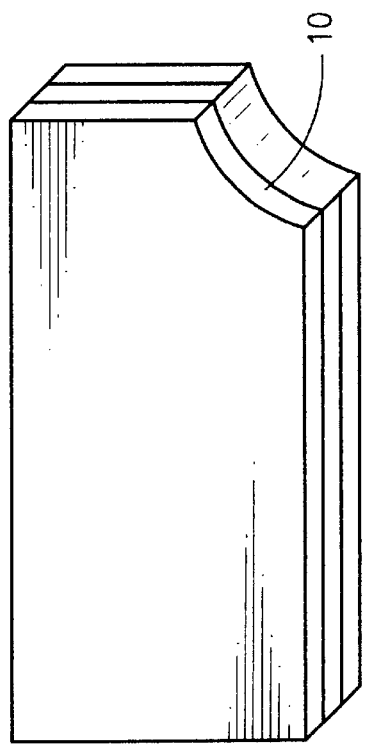
FIG. 4 is a partial cross sectional view of a piece of furniture in accordance with the present invention.

Once formed, and with reference to FIG. 2, the decorative laminate 10 may be used in the construction of a wall panel system 30 (see FIG. 2), flooring panels 32 (see FIG. 3) and furniture 34 (see FIG. 4) in a conventional manner. In fact, the decorative laminate may be used in the construction of a variety a structures where it is desired to prevent the penetration of radiation therethrough.

It is contemplated that the present laminate will be especially useful in the construction of rooms which must be isolated based upon regular exposure to radiation, whether for medical, research or industrial purposes. With this in mind, it is contemplated that the present laminate may used in the construction of ceiling and wall panels, flooring, furniture, fixtures, cabinet and door cladding, protective screens and other objects which will effectively prevent the passage of radiation from the isolated enclosure.

While various preferred embodiments have been shown and described, it will be understood that there is no intent to limit the invention by such disclosure, but rather, is intended to cover all modifications and alternate constructions falling within the spirit and scope of the invention as defined in the appended claims.

What is claimed is:

1. A laminate, comprising:

a polymer layer composed of a phenolic resin impregnated kraft paper;

a lead layer; and a binding layer composed of a copolymer consisting of styrene and maleic anhydride positioned between the polymer layer and the lead layer.

2. A laminate, comprising:

a decorative layer;

a first resin impregnated core layer composed of phenolic resin impregnated kraft paper;

a radiation barrier layer;

a second resin impregnated core layer composed of a phenolic resin impregnated kraft paper;

a first binding layer composed of a copolymer consisting of styrene and maleic anhydride coupling the first resin impregnated layer to the radiation barrier layer; and a second binding layer composed of a copolymer consisting of styrene and maleic anhydride coupling the second resin impregnated layer to the radiation barrier layer.

3. The laminate according to claim 2, wherein the radiation barrier layer is a lead sheet.

4. The laminate according to claim 2, further including an overlay paper layer bonded to the decorative layer opposite the first resin impregnated layer.

5. The laminate according to claim 2, wherein the laminate is a flooring panel.

6. The laminate according to claim 2, wherein the laminate is a wall panel.

* * * * *